July 1, 1930.  W. E. MATHEWS  1,769,899
COMPRESSOR VALVE
Filed July 23, 1928  2 Sheets-Sheet 1

Inventor
W.E. Mathews
By Johnston & Jennings
Attorneys

July 1, 1930. W. E. MATHEWS 1,769,899
COMPRESSOR VALVE
Filed July 23, 1928 2 Sheets-Sheet 2
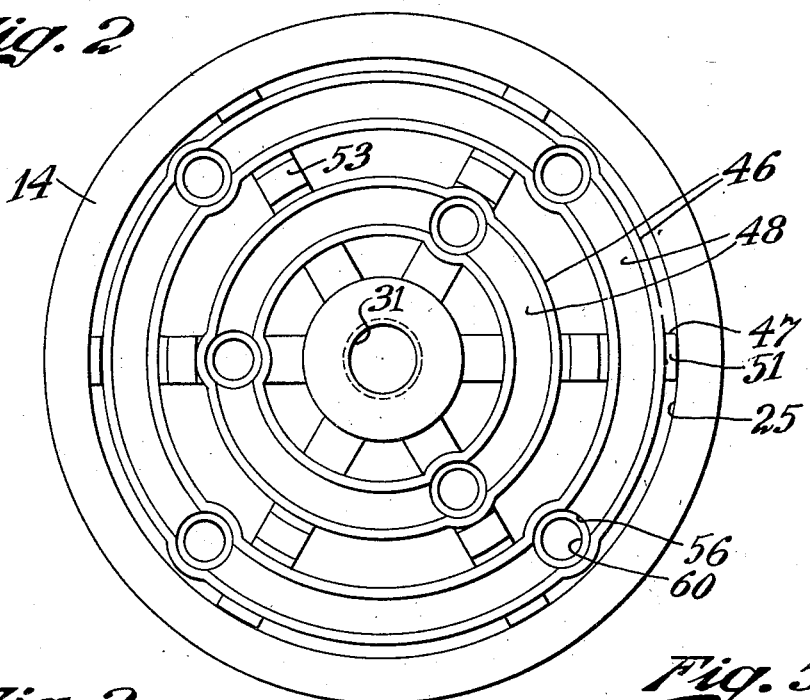
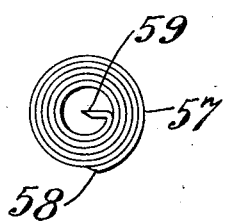
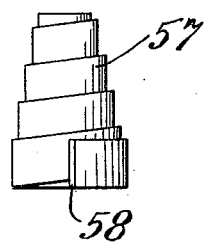
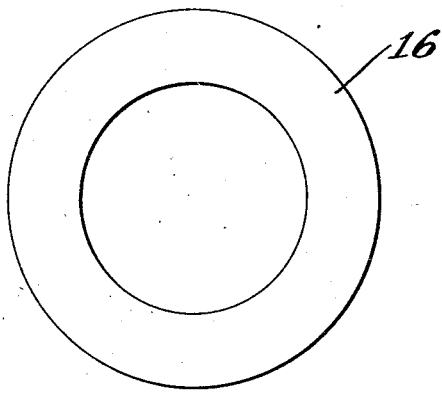
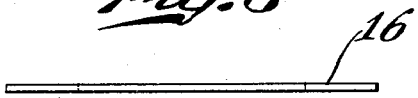
Inventor
W.E.Mathews
By Johnston & Jennings
Attorneys Patented July 1, 1930

1,769,899

UNITED STATES PATENT OFFICE

WILLIAM E. MATHEWS, OF BIRMINGHAM, ALABAMA, ASSIGNOR TO HARDIE-TYNES MANUFACTURING COMPANY, A CORPORATION OF ALABAMA

COMPRESSOR VALVE

Application filed July 23, 1928. Serial No. 294,906.

My invention relates to valves, more particularly to valves of the ring plate type such as are employed in compressors, and has for its object the provision of apparatus of the character designated which shall be simple of design and easy of assembly and which shall include effective means preventing leakage between the valve parts.

A further object of my invention is to provide a valve of the ring plate type wherein means are included for effecting a slight turning movement of the valve at each actuation thereof, resulting in its seating in a different position at each opening and closing.

A still further object of my invention is to provide a valve of the ring plate type embodying seat and guard elements and wherein novel effective means are provided for securing the plate and guard elements together.

In the design of compressor valves of the ring plate type it is universally recognized as desirable that the valves be made reversible so that they may be employed either as inlet or discharge valves. It is also necessary, where the valve embodies a seat member and a guard member, that the guard and seat be so joined together that leakage is prevented between them. Difficulties have been encountered in accomplishing these desired results, however, due to the fact that a bolt extending through the two members is liable to become loose and leak on perhaps drop into the compressor cylinder, and a stud extending only part way through the members is difficult to tighten due to the entrapment of air beneath the ends of the stud. Another difficulty in the design of such valves resides in the fact that the ring plates, where opening and closing with a purely reciprocal motion eventually become unevenly worn and leak.

These and other difficulties are overcome by means of my invention wherein I provide seat and guard members having aligned threaded holes in the members. The hole in the guard member extends only part way therethrough while the hole in the seat member extends all the way therethrough and is provided, intermediate its ends, with a shoulder. A stud is provided for holding the members together and is hollowed out where it screws into the guard member. On the end screwing into the seat member is provided a fillet which cooperates as a valve with the reduced diameter of the hole to prevent leakage by the stud. In addition to this failure I provide novel effective means for preventing leakage between the outside edges of the members.

One of the most important features of my invention is the provision of means for imparting a relative rotary movement to the ring plates at each movement thereof away from and toward their seats. It has heretofore been the practice to normally hold the ring plates against their seats by means of volute springs. In so doing, the ends of the springs have heretofore been carefully rounded off to prevent damaging the ring plates which have heretofore been made of relatively soft metal. In accordance with my invention I make the ring plates of a tough, relatively hard metal, such as saw steel and form the volute springs with sharp cornered ends so that they engage the ring plates and the spring supports at each compression thereof. Inasmuch as a slight torsional strain is imposed on the springs every time they are compressed, they effect a slight turning movement on the ring plates at each compression of the springs, while the engagement with the tough metal of the ring plates has no harmful effect thereon. I thus provide a valve which is maintained in a clean polished condition and one which will run indefinitely without leakage.

Other important features of my invention will become apparent from the following detailed description, together with the drawings, forming a part of this application, wherein Fig. 1 is a vertical sectional view through my improved valve;

Fig. 2 is an enlarged plan view of the valve guard;

Fig. 3 is a plan view of a spring for holding a plate member on its seat;

Fig. 4 is a side elevation of the spring;

Fig. 5 is a plan view of one of the ring plates, and

Fig. 6 is a side elevation of the same.

Figure 1:
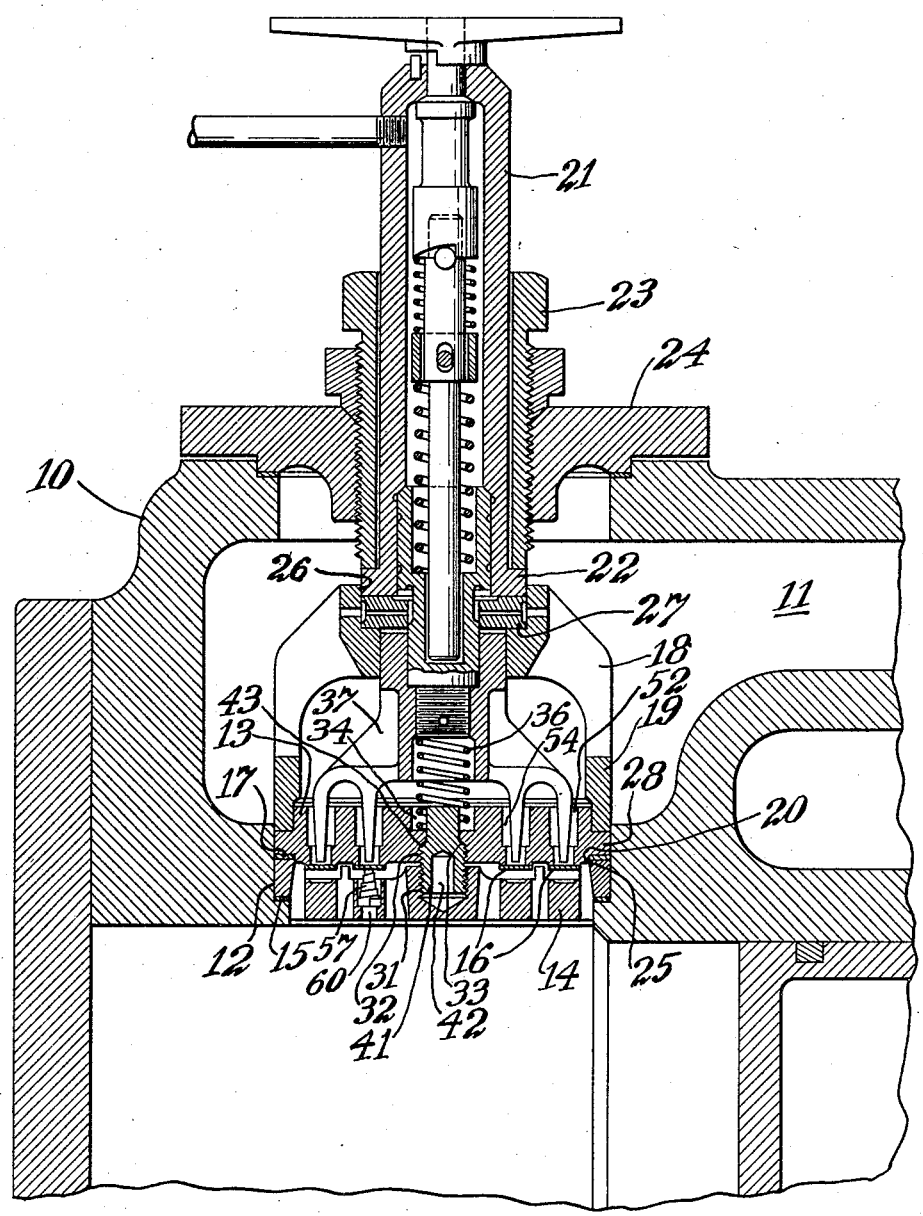

Referring now to the drawings for a better understanding of my invention, I show a fragment 10 of a compressor cylinder having an inlet passage 11 along the side thereof and having provided a shouldered recess 12 in the wall thereof. Disposed within the shouldered recess 12 is my improved valve which comprises a seat member 13 and a guard member 14 having interposed therebetween a plurality of ring plates 16.

Between the seat member 13 and the guard member 14 is a soft metal gasket 17 and between the guard member 14 and the bottom of the recess 12 is a gasket 15. The members 13 and 14 are held in place in the recess 12 by means of a keeper 18 having a ring 19 at the lower end thereof, bearing against the seat member 13. The keeper 18 is held in place, in the example shown, by means of a casing 21 having a lower flange 22 and surrounded by a sleeve 23 screwed into a valve bonnet 24. The sleeve 23 is screwed tightly down against the flange 22 and the flange 22 is centered in an opening 26 in the keeper 18 which latter opening has disposed therein a bushing 27 to receive the thrust of the casing 21. The ring 19 of the keeper pushes tightly down against an outer flange 28 on the seat member 13 so as to press the seat and guard members tightly against the gaskets 15 and 17 and prevent leakage thereby. It will be seen that the outer diameters of the seat and guard members are the same and that the position of the valve may be reversed to function as a discharge valve as well as an inlet valve.

The seat member 13 is turned on its lower side, as seen in the drawing, to provide an annular shoulder 20 thereon and the guard member 14 is bored to form a ring 25 fitting snugly over the shoulder 20, thereby centering the members with respect to each other.

The casing 21 is part of a valve unloader mechanism such as is described and claimed in my copending application, Serial No. 294,907, filed concurrently herewith, and assigned to the Hardie-Tynes Manufacturing Company. The operating features of this unloader will accordingly not be described in detail in this application. I desire to point out, however, that while I have shown the keeper 18 held in place by the casing 21, it might be held in place by any suitable means known in the art.

In order that my improved valve may be reversible, that is, may be used either as an inlet or a discharge valve, without danger of parts becoming loose or falling out of the valve and into the compressor, I provide a threaded hole 31 centrally in the guard member 14 and extending only partway through the guard member. The seat member 13 is provided with a similar threaded hole 32 but which extends all the way through the seat member and is provided with a shoulder 33 midway between its ends. The outer end of the hole 32 is left smooth to provide a recess 34 which forms a spring seat for a spring 36, the function of which is to hold an unloading fork 37 away from the ring plate 16 except when the compressor is to be unloaded.

Screwed into the holes 32 and 31 is a stud 41 made hollow at its lower end, as shown at 42, so that, when screwed into the guard member 14, the hollow forms a chamber for the collection of air and the stud may be readily screwed down to the bottom of the hole. The upper end of the stud is reduced in diameter and provided with a fillet forming a valve portion 43 which is forced tightly into the reduced diameter hole formed by the shoulder 33 of the hole 32 and thus prevents leakage through the member when tightened down. The upper end of the stud 41 is made small enough to extend into the recess 34 and thus serves as a keeper for the springs 36.

Another important feature of my invention is the formation of the guard member 14 which is shown in detail in Fig. 2. The guard member 14 comprises concentric rings 46 held together by radially extending webs 47. The rings plates 16 are disposed directly above the rings 46 and the rings 46 are provided with grooves 48 in the faces thereof to prevent the ring plates 16 from sticking thereagainst when they are pushed down against the rings.

The webs 47 are provided, outside the outer ring plate 16, with protuberances 51 which coact with the outer edge of the ring plate and act as guides to maintain the ring plate in proper alignment with an outer series of ports 52 in the seat member 13. The inner ring plate 16 is guided by means of similar protuberances 53 on the webs 47 and around the outer periphery of the ring plate to maintain the inner ring plate in proper alignment with an inner series of ports 54 in the seat member 13.

In order to provide a valve which is self cleaning and one which seats in a different position at each opening and closing thereof, I provide the guard member 14 with series of equally spaced recesses 56 in which are positioned volute springs 57 which latter bear against the ring plate 16 and normally hold them on their seats so as to close their respective ports. The ring plates are made of especially tough metal, such as saw steel, and the springs 57 are made of especially hard steel. In forming the springs I purposely leave the ends thereof with sharp corners 58 and 59 which engage with the bottoms of the recesses 56 and with the surfaces of the ring plates whenever compressed. Inasmuch as the compression of a spring of this type exerts a slight torsional strain thereon, the corner 59, engaging with the ring plates 16 effects a slight rotative movement of the latter when the ring plate moves away from and toward its seat, the corner 58 engaging the stationary bottom of the recess 56. To provide further relief for the ring plates when pressed downwardly against the rings 46 and to provide means whereby oil and dirt will not collect in the recesses 56 and impede the action of the springs 57, I provide holes 60 extending from the bottom of the recesses through the guard member. With these holes, oil going into the recesses passes on through the guard member and, being in motion, serves to lubricate the springs.

While I have shown my invention in but one form, it will be obvious to those skilled in the art that it is not so limited but is susceptible of various changes and modifications without departing from the spirit thereof and I desire therefore that only such limitations shall be placed thereupon as are imposed by the prior art or as are specifically set forth in the appended claims.

What I claim is:

1. In a compressor valve of the ring plate type, a ported seat member having a hole extending centrally therethrough and having a shoulder between its ends, said hole being tapped on its inner end, a guard member having a similar tapped hole extending part way therethrough, and a stud having a hollow end screwed into the hole in the guard and its other end screwed into the tapped hole in the seat.

2. In a compressor valve of the ring plate type, a ported seat member having a hole extending centrally therethrough and having a shoulder between its ends, said hole being tapped on its inner end, a guard member having a simliar tapped hole extending part way therethrough, a stud having a hollow end screwed into the hole in the guard and its other end screwed into the tapped hole in the seat, and having a valve portion cooperating with the shoulder in the hole to prevent leakage.

3. In a compressor valve of the ring plate type, a ported seat member having a hole extending centrally therethrough and having a shoulder between its ends, said hole being tapped on its inner end, a guard member having a similar tapped hole extending part way therethrough, a stud having a hollow end screwed into the hole in the guard and its other end screwed into the hole tapped in the seat and having a valve portion cooperating with the shoulder in the hole to prevent leakage, a gasket between the guard and seat members, and means other than the stud for tightening the members against the gasket.

4. In a compressor valve of the ring plate type, a ported seat member having a hole extending centrally therethrough and having a shoulder between its ends, said hole being tapped on its inner end, a guard member having a similar tapped hole extending part way therethrough, a stud having a hollow end screwed into the hole in the guard and its other end screwed into the hole tapped in the seat and having a valve portion cooperating with the shoulder in the hole to prevent leakage, a gasket between the guard and seat members, means other than the stud for tightening the members against the gasket, ring plate members coacting with the ports in the seat, and guide elements on the guard member around the outer edges of the ring plate members to hold them in alignment with the ports.

5. In a compressor valve of the ring plate type, a ported seat member having a hole extending centrally therethrough and having a shoulder between its ends, said hole being tapped on its inner end, a guard member having a similar tapped hole extending part way therethrough, a stud having a hollow end screwed into the hole in the guard, and a reduced end on the stud extending beyond the shoulder into the hole on the opposite side of the seat member to form a spring guard in cooperation with the wall of the hole.

6. In a compressor valve of the ring plate type, a ported seat member having a hole extending centrally therethrough and having a shoulder between its ends, said hole being tapped on its inner end, a guard member having a similar tapped hole extending part way therethrough, a stud having a hollow end screwed into the hole in the guard and its other end screwed into the hole tapped in the seat and having a valve portion coacting with the shoulder in the hole to prevent leakage, a gasket between the guard and seat members, means formed in the compressor wall for retaining the members, a keeper comprising a ring bearing against the outer side of the assembled members, and means for forcing the keeper tightly against said members to tighten them against the gasket.

7. In a ring plate type compressor valve embodying a ring plate valve member, and a seat for said member, a plurality of volute springs for biasing said member toward its seat, and sharpened ends on the springs for engagement with the valve member at each opening and closing thereof to effect a turning movement of the plate valve member.

8. In a compressor valve embodying a seat, a ring plate valve and a guard, said guard having recesses for the positioning of springs to hold the valve on its seat, volute springs in the recesses and bearing against the valve, and angular corners provided on the ends of the springs for engagement with the valve and the bottoms of the recesses to impart a rotative movement to the valve.

9. In a compressor valve embodying a seat, a ring plate valve and a guard, said guard having recesses for the positioning of springs to hold the valve on its seat, volute springs in the recesses and bearing against the valve, and angular corners provided on the ends of the springs for engagement with the valve and the bottoms of the recesses to impart a rotative movement to the valve, the guard being provided with vent holes extending therethrough from the bottoms of the recesses.

In testimony whereof I affix my signature.

WILLIAM E. MATHEWS.